US006539832B1

(12) United States Patent
Nilsson

(10) Patent No.: US 6,539,832 B1
(45) Date of Patent: Apr. 1, 2003

(54) HYDRAULIC STRETCHING DEVICE FOR A SAW CHAIN

(75) Inventor: Gunnar Nilsson, Röbäck (SE)

(73) Assignee: Partek Forest AB, Umea (SE)

( * ) Notice: Subject to any disclaimer, the term of this patent is extended or adjusted under 35 U.S.C. 154(b) by 0 days.

(21) Appl. No.: 09/622,505

(22) PCT Filed: Feb. 16, 1999

(86) PCT No.: PCT/SE99/00199

§ 371 (c)(1),
(2), (4) Date: Sep. 27, 2000

(87) PCT Pub. No.: WO99/42262

PCT Pub. Date: Aug. 26, 1999

(30) Foreign Application Priority Data

Feb. 20, 1998 (SE) .............................................. 9800501

(51) Int. Cl.[7] .......................... B27B 17/00; B23D 57/02

(52) U.S. Cl. .............................. 83/818; 83/819; 30/386

(58) Field of Search ..................... 30/385, 386; 83/819, 83/818, 816

(56) References Cited

U.S. PATENT DOCUMENTS

| | | | | |
|---|---|---|---|---|
| 3,247,873 A | * | 4/1966 | Aitken et al. | 30/386 |
| 4,129,943 A | * | 12/1978 | Bricker | 30/386 |
| 4,915,317 A | * | 4/1990 | Birch | 242/527.5 |
| 4,926,733 A | * | 5/1990 | Janson | 83/58 |
| 5,103,881 A | * | 4/1992 | Johnson | 144/336 |
| 5,174,029 A | * | 12/1992 | Talberg | 30/385 |

(List continued on next page.)

FOREIGN PATENT DOCUMENTS

| | | |
|---|---|---|
| CH | 301514 A | 11/1954 |
| DE | 970240 A5 | 8/1958 |
| SE | 91033589 A | 5/1993 |

*Primary Examiner*—Allan N. Shoap
*Assistant Examiner*—Jason Prone
(74) *Attorney, Agent, or Firm*—Ware, Fressola Van der Sluys & Adolphson LLP

(57) ABSTRACT

A hydraulic stretching device for a saw chain active in sawing apparatus having a saw bar and including a holder (1), a driving wheel (3) for the saw chain arranged essentially stationary in relation to the holder and a guiding part (7) permanently arranged at a saw bar to interact with the holder (1). The guiding part (7) is permanently attached to resist turning and axially displaceable in relation to the holder (1) in the longitudinal direction (8) of the saw bar to allow stretching of a saw chain running round the saw bar (6) and the driving wheel (3). The stretching device for a saw chain is arranged to be active between the holder (1) and the guiding device (7) and including a hydraulically influenced piston (10). The piston (10) is arranged in a displaceable manner at the holder in parallel with the longitudinal direction (8) of the saw bar and has an engaging surface (11) intended to engage an opposing surface (12) on the guiding part (7). The engaging surface and the opposing surface are located in parallel planes and that these planes are arranged at an angle to a plane perpendicular to the longitudinal axis of the saw bar. In this way, the piston (10), when it engages the surfaces, affects the guiding part (7) with a force F whose components act partly in the longitudinal direction of the saw bar ($F_s$) to stretch the saw chain and partly in a direction across the longitudinal direction of the saw bar ($F_8$) to achieve a stabilizing gripping of the parts that move in relation to one another. In addition, a compressible mechanism (13,14) is arranged to engage between the piston and the guiding part before the engaging and opposing surfaces engage one another, whereby an initial stretching of the saw chain is achieved before the combined stretching and gripping effect is realized.

6 Claims, 1 Drawing Sheet

U.S. PATENT DOCUMENTS

| | | | | | |
|---|---|---|---|---|---|
| 5,272,946 | A | * | 12/1993 | McCullough et al. | 144/34.1 |
| 5,396,705 | A | * | 3/1995 | Leini | 30/386 |
| 5,497,557 | A | * | 3/1996 | Martinsson | 30/386 |
| 5,528,835 | A | * | 6/1996 | Ra | 30/386 |
| 5,533,432 | A | * | 7/1996 | Ornberg | 30/383 |
| 5,709,254 | A | * | 1/1998 | Argue | 144/336 |
| 5,896,670 | A | * | 4/1999 | Gibson et al. | 30/386 |
| 5,983,508 | A | * | 11/1999 | Sundstrom | 30/386 |
| 6,032,373 | A | * | 3/2000 | Peterson | 30/383 |
| 6,061,915 | A | * | 5/2000 | Seigneur et al. | 30/386 |
| 6,148,525 | A | * | 11/2000 | Mizutani et al. | 30/386 |
| 6,237,228 | B1 | * | 5/2001 | Moody | 30/386 |
| 6,237,229 | B1 | * | 5/2001 | Igawa et al. | 30/386 |
| 6,296,586 | B1 | * | 10/2001 | Walkenhorst et al. | 30/386 |
| 6,311,599 | B1 | * | 11/2001 | Lindehall | 30/386 |
| 6,345,447 | B1 | * | 2/2002 | Ronkko | 30/386 |
| 6,389,700 | B2 | * | 5/2002 | Paquin | 30/386 |
| 6,473,975 | B1 | * | 11/2002 | Sellmann | 30/386 |

* cited by examiner

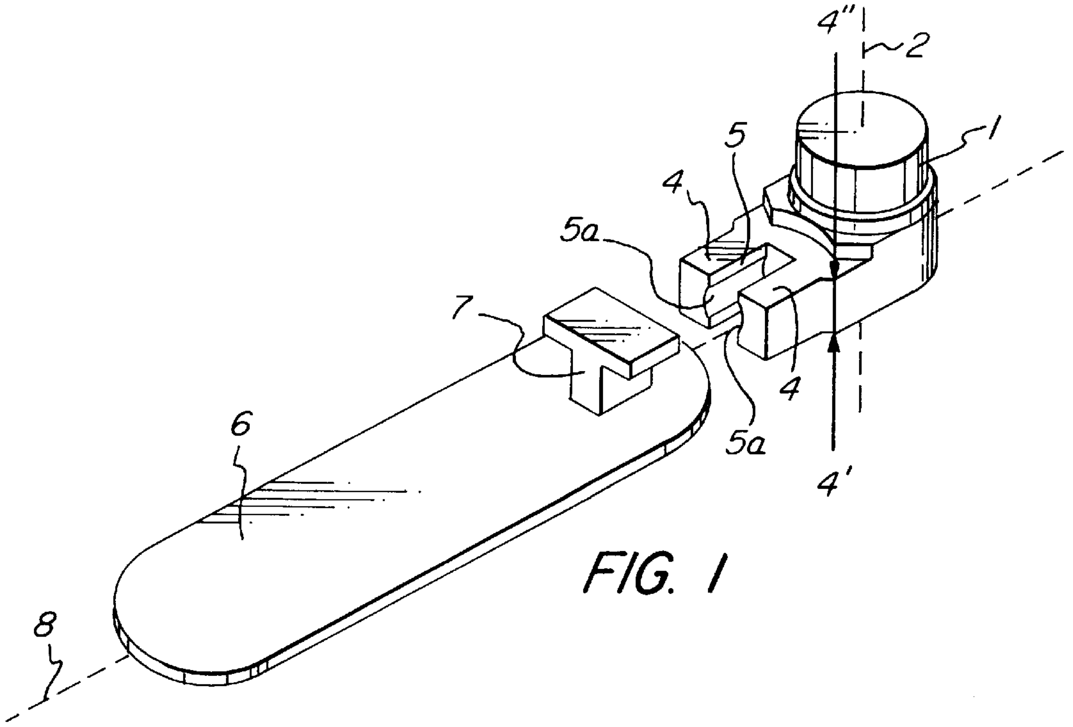
FIG. 1
FIG. 2
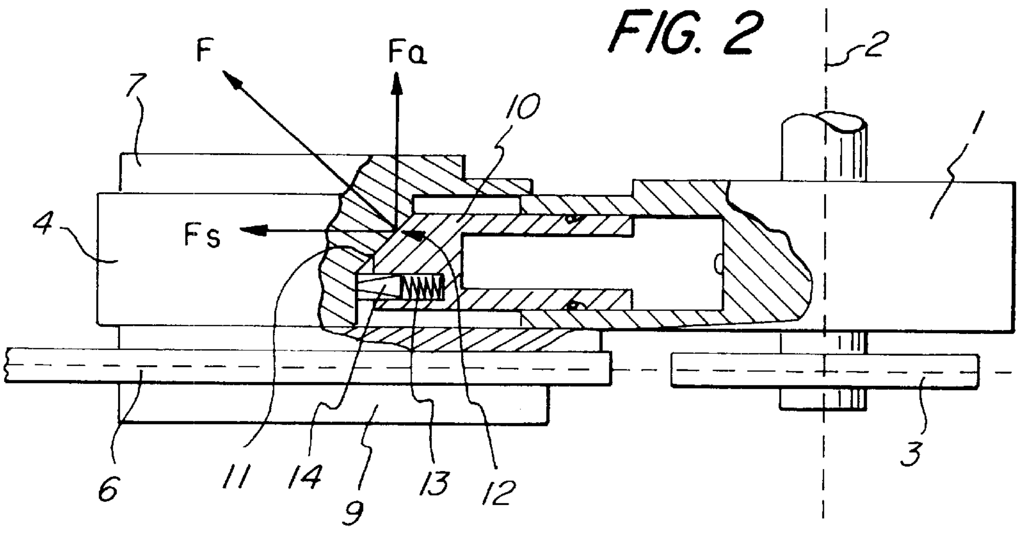
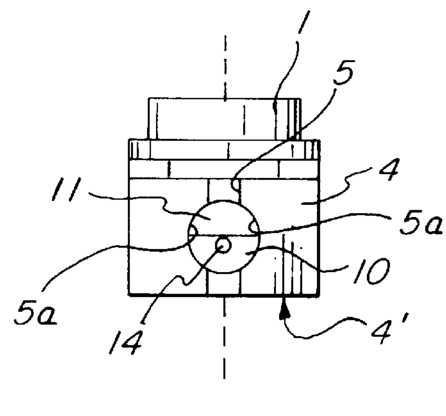
FIG. 3

HYDRAULIC STRETCHING DEVICE FOR A SAW CHAIN

The present invention relates to a hydraulic stretching device for a saw chain used in a sawing apparatus with a saw bar and includes a holder, a driving wheel arranged at the holder for the saw chain, and a guiding part permanently arranged at the saw bar to interact with the holder and allow the stretching of the saw chain running around the driving wheel and the saw bar.

When mechanized means are used to improve the efficiency of logging operations, it is preferable to use what is known as a timber cutting unit comprising a sawing gear that includes a saw chain and a saw bar. Efficient logging puts high demands on the equipment used with regard to safety, robustness and case-of-use as well as precision and performance, i.e. that the equipment should work speedily and distinctly.

It is well known that a saw chain that rotates under such conditions with high speed around a saw bar in a sawing device requires chain tightening at relatively short intervals. In addition, it is also known that the problem of chain tightening can be solved by an automatic and continuous tightening of the saw chain. This is achieved by making the saw bar displaceable in the longitudinal direction of the saw bar in relation to the driving wheel of the saw chain. However, the chain-tightening force must not be too great, as too great a tension increases the wear on the chain and shortens the working life of both the saw chain itself and the wheel around which the saw chain runs at the free end of the saw bar. It is also known to arrange a hydraulically influenced piston that is active in line with and parallel with the longitudinal direction of the saw bar to accomplish the displacement of the saw bar that stretches the saw chain.

In addition, to ensure good performance, the saw bar that is arranged to be displaced in its longitudinal direction should be distinct and not be allowed to have any free play. The occurrence of play in the parts that move in relation to one another during displacement has been shown to be overcame with known technology by means of hydraulic clamping pistons acting across the direction of displacement of the saw bar. These act to grip and stabilise through pressing the parts that move in relation to one another against one another, thereby counteracting free play. This means, however, that the arrangement has to be provided with additional hydraulic piston, which take up space and need to be connected to the hydraulic system, and which means increased costs for manufacture and later for service and maintenance. Each hydraulic piston is a potential source of leakage.

SUMMARY OF THE INVENTION

The objective of the present invention is to overcome the disadvantages stated above and achieve a device for stretching a saw chain that, using only one hydraulic piston, partly stretches and partly stabilizes by gripping the parts that move in relation in one another in the displaceable connection between the holder and the saw bar.

The objective is achieved with a hydraulic stretching device for a saw chain in a sawing apparatus having a saw bar and comprising:

(a) a holder; (b) a driving wheel for the saw chain arranged essentially stationary in relation to the holder, the saw chain being adapted to travel around the driving wheel and saw bar;

(c) a guiding part permanently arranged at the saw bar to interact with the holder and resist turning, the guiding part and the saw bar being axially displaceable in relation to the holder in a direction of a longitudinal axis of the saw bar to allow stretching of the saw chain travelling around the saw bar and the driving wheel;

(d) a hydraulically influenced piston arranged in a displaceable manner at the holder in parallel with the longitudinal axis of the saw bar, the piston having an engaging surface adapted to engage an opposing surface on the guiding part, the engaging surface and the opposing surface are located in parallel planes and these planes are arranged at an angle to a plane perpendicular to the longitudinal axis of the saw bar, whereby when the piston causes the surfaces to engage, the piston influences the guiding part with a force F whose components act partly in a direction of the longitudinal axis of the saw bar to stretch the saw chain and partly in a direction across the direction of the longitudinal axis of the saw bar to achieve a stabilizing gripping of the saw bar, holder and guiding part that move in relation to one another; and (e) compressible means arranged to engage between the piston and the guiding part before the engaging and opposing surfaces engage one another, whereby an initial stretching of the saw chain is achieved before the combined stretching and gripping effect of the force F is realized.

Further features and advantages of the invention will become evident from the following detailed description of preferred embodiments of the invention that constitute examples and, as such, are not limiting for the scope of protection of the invention.

BRIEF DESCRIPTION OF THE DRAWING

To simplify understanding, the text includes references to the enclosed drawings, in which equivalent or similar parts have been assigned the same reference number.

FIG. 1 shows schematically a holder and a saw bar pulled apart from one another.

FIG. 2 shows schematically a device for stretching a saw chain according to one embodiment of the present invention.

FIG. 3 shows the holder according to FIG. 2 in a frontal view.

DETAILED DESCRIPTION OF THE INVENTION

FIG. 1 shows schematically a holder 1 for mounting in a sawing apparatus. Usually, the holder 1 is arranged to pivot around an axis 2 and equipped on its underside with a driving wheel 3 for a saw chain (not shown) as shown schematically in FIG. 2. In the present embodiment, the axis of rotation of the driving wheel 3 is assumed to coincide wish the axis of rotation 2 of the holder, but this does not necessarily have to be the case.

The holder 1 has two projecting fork-shaped sections 4 that delineate a guiding groove 5 or space between them. The groove 5 is threaded to guide the accommodation of a guiding part 7 that is permanently attached to the saw bar 6. Guiding part 7 is displaceable in forward and return directions in the groove 5 to regulate the stretching of the saw chain running around the saw bar 6 and the driving wheel 3. The groove 5 is thus made with a cross-sectional profile that is essentially constant when seen from the direction of displacement of the guiding part 7. In FIGS. 1 and 2, this direction coincides with an axis 8 that is arranged at right angles to the axis of rotation 2 of the driving wheel 3.

The construction design of the guided displacement that takes place between the holder 1 and the saw bar 6—or the guiding part 7 of the saw bar—can be accomplished in a number of different variations. It is obvious for a person knowledgeable in the art that the displacement should resist turning and besides that be linear with an axis that is parallel with the longitudinal axis of the saw bar. Design variations of the displacement will therefore not be discussed is more detail.

According to the present embodiment, the fork sections 4 have a first sliding surface 4' that abuts the saw bar 6, either directly or indirectly via an intermediate plate. The first sliding surface 4' is arranged in a plane that constitutes the plane that is perpendicular to the axis of rotation 2 of the driving wheel 3. This sliding surface 4' is intended to act as a sliding surface during stretching of the saw chain. The same sliding surface 4 is intended to press against the saw bar 6 to stabilize the saw bar 6.

According to the present embodiment, the guiding part 7 has an essentially H-shaped cross-sectional profile and, together with the saw bar 6, forms an end section whose waist section is intended to be accommodated in the groove between the fork-shaped sections 4. In this way, a displaceable termination of the saw bar 6 that resists turning is achieved in the longitudinal direction of the saw bar 6 to relation 14 the holder 1.

The flange section arranged above the waist section of the guiding part 7 is arranged to slide against the upper surface 4" of the fork-shaped sections.

Furthermore, in the present embodiment, the saw bar 6 is arranged to accommodate the waist section in a recess commonly found in the bar for fitting the section into the saw bar 6, as is evident from FIG. 2. In addition, the underneath of the saw bar 6 is arranged to lie against the lower flange section 9 of the guiding part. Here, the saw bar 6 will abut the underneath surface 4' of the fork-shaped sections 4.

To achieve in part the stretching displacement of the saw chain in the longitudinal direction 8 of the saw bar and in part the stabilizing force acting across this direction of stretching, a hydraulically maneuverable piston is, according to the present embodiment, arranged to the holder 1 and active along an axis parallel with the longitudinal direction 8 of the saw bar 6.

For its maneuverability, the piston to is preferably connected to a hydraulic system, whereby a continuous and even supply of force is achieved during operation. The connection can advantageously include a valve device that applies a hydraulic pressure during the operation of the hydraulic system and that evacuates the hydraulic pressure that influences the piston 10 when the hydraulic system ceases operation.

The piston 10 has, along the entire length thereof which interacts with the holder 1, at least a partly interacting cross-sectional profile that provides support when taking up forces acting on the piston 10 in directions that deviate from the longitudinal axis of the piston 10. The groove 5 in the holder 1 guides the guiding part 7. The piston 10 has an essentially circular cross-sectional profile and a diameter that exceeds the width of the groove 5. A pair of recesses 5*a* (FIGS. 1 and 3) complimentary to the shape of the profile of the piston 10 are arranged in the holder 1 adjacent the groove 5 to allow the piston 10 to run in the groove 5 and thereby provide interactive support for the piston 10.

The piston 10 according to the invention has its engaging surface 11 at an oblique angle in relation to the perpendicular plane of its direction of movement.

This obliquely-angled engaging surface 11 is intended to abut a surface 12 With similar angle arranged on the guiding part 7, whereby force F influencing the guiding part 7 acquires a direction chat is equivalent to a direction that is perpendicular to the plane of contact between the surfaces 11 and 12.

By selecting the angle of this plane of contact, the distribution of the components of force F between $F_s$ in a stretching direction and $F_3$ in an gripping direction can be regulated.

It can be desirable to acquire an initial stretching of the saw chain before the stabilizing gripping force has its effect. This can be achieved by a compressible means arranged between the gripping points at the piston and the guiding part that is straight, i.e. not angled, and that only transfers the force forwards in the direction of the movement of the piston.

In the embodiment according to FIGS. 2 and 3, the compressible means includes a pressure pin 14 pushed forward by a spiral spring 13. The pressure 14 and the spring 13 are arranged to the lower flat part of the piston 10 and tilt sloping engaging plane 11 is arranged above this.

When the piston 10 moves forward to stretch the saw chain, the forward moving pressure pin 14 will first abut the flat part of the guiding part 7. When the stretching force becomes so great that it exceeds the force of the spring 13, the pressure pin 14 is pressed into the piston 10 and the engaging surface 11 grips surface 12.

In other embodiments, the compressible means can include, for example, an elastic material, a pressure chamber, etc. for achieving the same technical function. The device has been described as arranged at the piston 10 but can naturally even be arranged at the guiding part 7.

What is claimed is:

1. Hydraulic stretching device for a saw chain in a sawing apparatus having a saw bar, comprising:

(a) a holder;

(b) a driving wheel for the saw chain, the saw chain being adapted to travel around the driving wheel and saw bar;

(c) a guiding part permanently arranged at the saw bar to interact with the holder and resist turning, the guiding part and the saw bar being axially displaceable in relation to the holder is a direction of a longitudinal axis of the saw bar to allow stretching of the saw chain travelling around the saw bar and the driving wheel;

(d) a hydraulically driven piston arranged in a displaceable manner at the holder in parallel with the longitudinal axis of the saw bar, the piston having an engaging surface adapted to engage as opposing surface on the guiding part, the engaging surface and the opposing surface are located in parallel planes and these planes are arranged at an angle to a plane perpendicular to the longitudinal axis of the saw bar, whereby when the piston causes the surfaces to engage, the piston influences the guiding part with a force F whose components act partly in a direction of the longitudinal axis of the saw bar to stretch the saw chain and partly in a direction perpendicular to the direction of the longitudinal axis of the saw bar to achieve a stabilizing gripping of the saw bar, holder and guiding part that move in relation to one another; and (e) compressible device arranged to engage between the piston and the guiding part before the engaging and opposing surfaces engage one another, the compressible device include a pressure pin tensioned by a spring and displaceable from a free end of the piston in a direction of movement thereof, whereby an initial stretching of the saw chain is achieved before the combined stretching and gripping effect of the force F is realized.

2. Stretching device for a saw chain according to claim 1, wherein the piston has, along at least a length thereof which interacts with the holder, a profile that provides support when taking up forces acting on the piston in directions that deviate from a longitudinal axis of the piston.

3. Stretching device for a saw chain according to claim 2, wherein the holder has a groove to guide the guiding part, the piston has a cross-sectional profile that exceeds a width of the groove, at least one recess complimentary to the shape of the profile of the piston is arranged in the holder adjacent the groove to allow the piston to run in the holder and thereby provide interactive support for the piston.

4. Hydraulic stretching device for a saw chain in a sawing apparatus having a saw bar, comprising:

(a) a holders (b) a driving wheel for the saw chain, the saw chain being adapted to travel around the driving wheel and saw bar;

(c) a guiding part permanently arranged at the saw bar to interact with the holder and resist turning, the guiding pant and the saw bar being axially displaceable in relation to the holder in a direction of a longitudinal axis of the saw bar to allow stretching of the saw chain travelling around the saw bar and the driving wheel;

(d) a hydraulically driven piston arranged in a displaceable manner at the holder in parallel with the longitudinal axis of the saw bar, the piston having an engaging surface adapted to engage an opposing surface on the guiding part, the engaging surface and the opposing surface are located in parallel planes and these planes are arranged at an angle to a plane perpendicular to the longitudinal axis of the saw bar, whereby when the piston causes the surfaces to engage, the piston influences the guiding part with a force F whose components act partly in a direction of the longitudinal axis of the saw bar to stretch the saw chain and partly in a direction perpendicular to the direction of the longitudinal axis of the saw bar to achieve a stabilizing gripping of the saw bar, holder and guiding part that move in relation to one another; and (e) compressible device arranged to engage between the piston and the guiding part before the engaging and opposing surfaces engage one another, whereby an initial stretching of the saw chain is achieved before the combined stretching and gripping effect of the force F is realized.

5. Stretching device for a saw chain according to claim wherein the piston has, along at least a length thereof which interacts with the holder, a profile that provides support when taking up forces acting on the piston in directions that deviate from a longitudinal axis of the piston.

6. Stretching device for a saw chain according to claim 5, wherein the holder has a groove to guide the guiding part, the piston has a cross-sectional profile that exceeds a width of the groove, at least one recess complimentary to the shape of the profile of the piston is arranged in the holder adjacent the groove to allow the piston to run in the holder and thereby provide interactive support for the piston.

* * * * *

UNITED STATES PATENT AND TRADEMARK OFFICE

CERTIFICATE OF CORRECTION

PATENT NO. : 6,539,832 B1 
DATED : April 1, 2003
INVENTOR(S) : Gunnar Nilsson

It is certified that error appears in the above-identified patent and that said Letters Patent is hereby corrected as shown below:

Title page,
Item [57], ABSTRACT,
Line 26, "($F_8$)" should be -- ($F_a$) --.

Column 1,
Line 3, -- Background of the Invention -- should be inserted.
Line 16, "case" should be -- ease --
Line 40, "overcame" should be -- overcome --.
Line 42, "stabilise" should be -- stabilize --.

Column 3,
Line 17, "4" should be -- 4' --.
Line 26, "14" should be -- to --.
Line 32, after "bar", -- 6 -- should be inserted.
Line 32, before "section", -- waist -- should be inserted.
Line 45, "to" should be --10 --.

Column 4,
Line 2, "With" should be -- with --.
Line 4, "chat" should be -- that --.
Line 9, "$F_3$" should be -- $F_a$ --.

Column 5,
Line 20, "a holders" should be -- a holder; --.

Column 6,
Line 20, after "claim", -- 4 -- should be inserted.

Signed and Sealed this

Sixteenth Day of September, 2003

JAMES E. ROGAN
*Director of the United States Patent and Trademark Office*